Oct. 18, 1966  E. P. HAEN ETAL  3,279,436
ROTARY DISCHARGE LIVESTOCK FEEDER

Original Filed Aug. 15, 1963  4 Sheets-Sheet 2

INVENTORS.
EUGENE P. HAEN
BY ROBERT W. SMITH

Andrus & Starke
ATTORNEYS

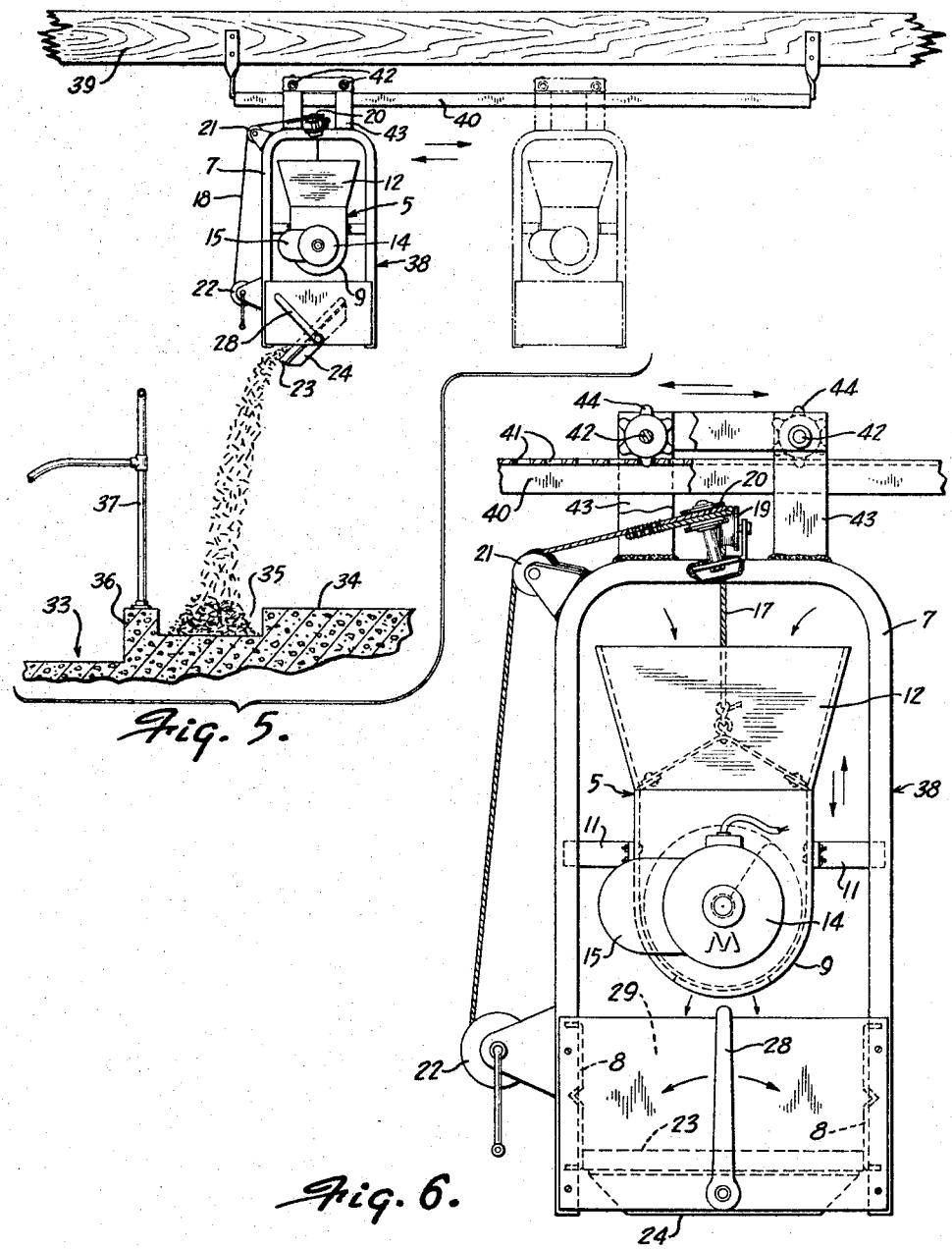

Oct. 18, 1966   E. P. HAEN ETAL   3,279,436
ROTARY DISCHARGE LIVESTOCK FEEDER

Original Filed Aug. 15, 1963   4 Sheets-Sheet 4

INVENTORS.
EUGENE P. HAEN
BY ROBERT W. SMITH

Andrus & Starke
ATTORNEYS

United States Patent Office 3,279,436
Patented Oct. 18, 1966

3,279,436
ROTARY DISCHARGE LIVESTOCK FEEDER
Eugene P. Haen and Robert W. Smith, Kaukauna, Wis., assignors, by mesne assignments, to Badger Northland, Inc., Kaukauna, Wis., a corporation of Delaware
Original application Aug. 15, 1963, Ser. No. 302,306. Divided and this application May 18, 1965, Ser. No. 456,716
8 Claims. (Cl. 119—56)

This application is a division of application Serial No. 302,306, filed August 15, 1963.

This invention relates to a livestock feeding apparatus. On a dairy farm, feed, such as corn silage or grass silage, is usually stored in a silo and removed, as needed, for feeding. Formerly, it was the practice to discharge the feed from the silo into a wagon in which it was conveyed to the feed area and the feed was then manually distributed to the cattle or other livestock. The operation of distributing the feed to the livestock requires considerable time and with the high cost of farm labor, often involves a substantial expense to the farmer. Recently, there has been considerable interest in automatic feeding devices which are employed to automatically distribute the feed to the livestock, either in the yard or in the barn. In a typical installation on a dairy farm, the feed or silage discharged from the silo is fed directly into a hopper located at one end of a bunk feeder, and the feed is then conveyed along the bunk feeder and distributed along the length of the bunk to the livestock.

The present invention is directed to an improved bunk feeder for feeding livestock. More specifically, the feeder of the invention comprises a frame which extends along the feed bunk and supports a conveyor housing having a series of openings in the lower surface. A spiral flight or auger is mounted within the housing and feed introduced into the housing is conveyed by the auger and distributed through the openings along the length of the feed bunk. According to the invention, a board or feed distributing member is mounted beneath the conveyor housing on the frame and the conveyor housing is raised or lowered with respect to the baffle to regulate or control the amount of feed being discharged from the openings in the conveyor housing onto the board. When the conveyor housing is at its lowermost position, the openings in the housing are substantially closed off by the baffle board with the result that feed is conveyed directly through the conveyor housing. As the conveyor housing is elevated from the baffle board, the amount of feed discharged through the openings in the conveyor housing is correspondingly increased.

The baffle board is pivoted about a central shaft and after the feed is distributed throughout the length of the feed bunk, the baffle board is tilted to dump the feed downwardly to the feed trough.

With the feeder of the invention, the silage or other feed is distributed along the entire length of the feed bunk at the same time and this eliminates cattle crowding around the forward portion of the bunk feeder, which occurs with the normal conveying mechanism. Furthermore, the feed can be deflected to either side of the conveyor housing so that uniform amounts of feed can be distributed to either side of the conveyor housing and it is possible to feed separate feed lots with different rations from one bunk feeder.

As the feed is not released or dumped into the feed trough until the feed is distributed throughout the length of the bunk, the wind loss will be minimized over a bunk feeder in which the feed dribbles out of openings along the entire length of the feeder.

The feeder of the invention can be adapted for use with any size feeding operation, and by regulating the height of the conveyor housing above the baffle board, the amount of feed to be distributed can be varied as desired.

In a modified form of the invention, a rotatable feed distributing member is positioned beneath the conveyor housing and includes a central shaft and a series of radially extending vanes which are connected to the shaft and define a series of sectors or compartments. One of the compartments is located beneath the conveyor housing and as the auger rotates, feed is discharged through the openings in the conveyor housing into the compartment. When the entire length of the compartment is filled with feed, the distributing member is rotated to dump the feed from the compartment into the feed trough and simultaneously move a second compartment beneath the conveyor housing in position to be filled with feed. With this construction, the amount of feed being fed to the livestock is primarily regulated by the number of compartments which are filled and dumped. The amount of feed collected in each compartment can be varied, if desired, by raising or lowering the conveyor housing with respect to the distributing member.

The drawings illustrate the best mode presently contemplated of carrying out the invention.

In the drawings:

FIG. 2 is a transverse section showing the feeder in connection with the bunk;

FIG. 3 is a plan view of the conveyor housing with parts broken away in section;

FIG. 4 is a schematic drawing showing the pressure-sensitive switch which is utilized to stop the feeding;

FIG. 5 is a modified form of the invention in which the feeding apparatus is suspended from the ceiling of a barn for traversing movement;

FIG. 6 is an enlarged fragmentary end view of the feeding apparatus with parts broken away in section;

Figure 1:
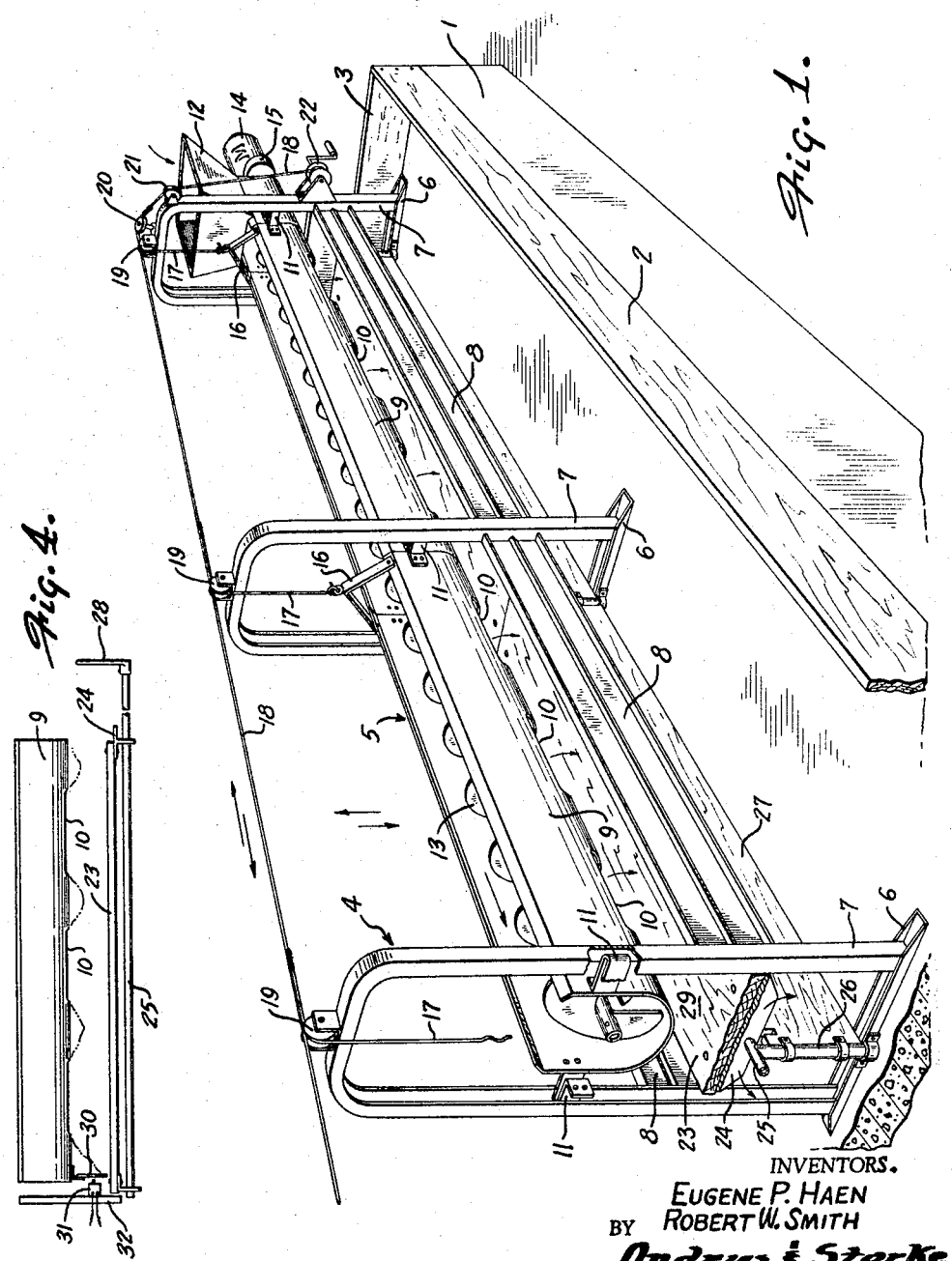
FIG. 1 is a perspective view of the feeding apparatus used with a bunk feeder with parts broken away in section.
Figures 7, 8, 9:
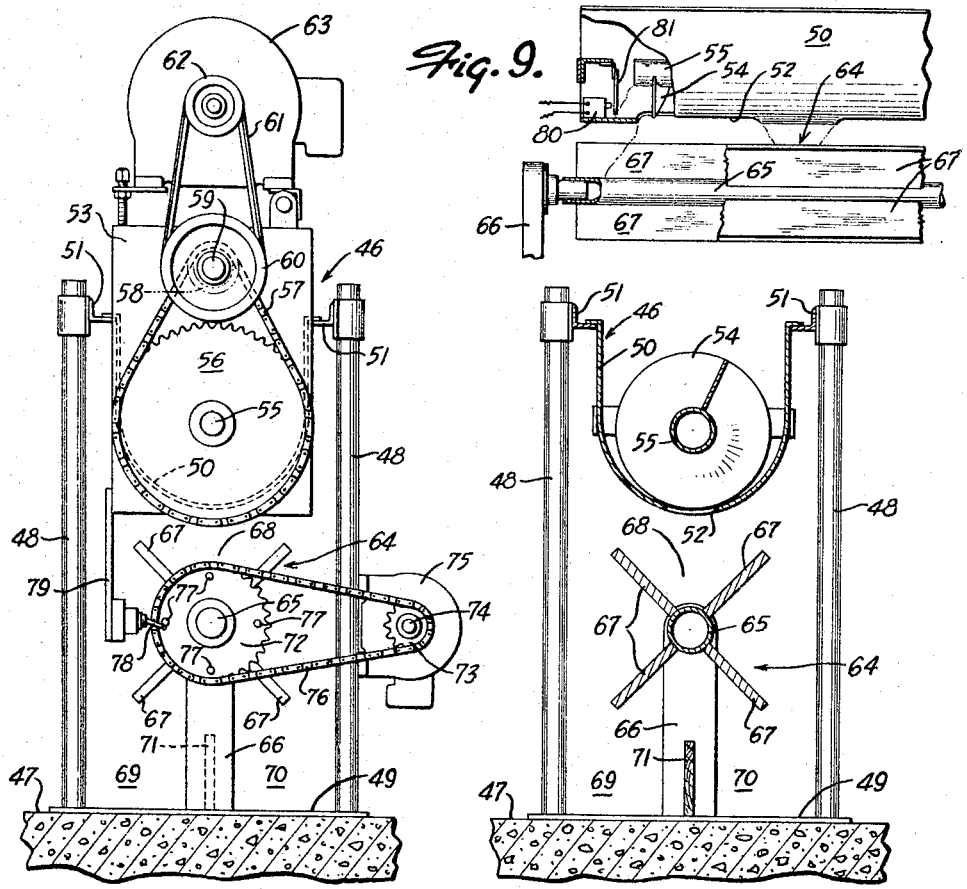
FIG. 7 is an end view of a second modified form of the invention.
FIG. 8 is a transverse section of the feeder shown in FIG. 7.
FIG. 9 is a fragmentary longitudinal section showing the outer end of the feeder.

The drawings illustrate a livestock feeding apparatus for automatically distributing feed to cattle or other livestock in the yard. As shown in FIG. 1, the apparatus includes a raised concrete feed bunk 1 having side boards 2 and end boards 3 to retain the feed on the bunk 1.

The feeding apparatus includes a frame 4 for supporting a conveying mechanism 5 which extends the length of the feed bunk. The frame 4 includes a series of spaced base members 6, and a generally U-shaped upright support 7 is secured to each base member 6 and extends upwardly a substantial distance above the bunk 1. The supports 7 have a channel-shaped cross section, with the open sides of the channels facing toward the center line of the bunk 1. The supports 7 are connected together by side wall members 8.

Figures 2, 3:
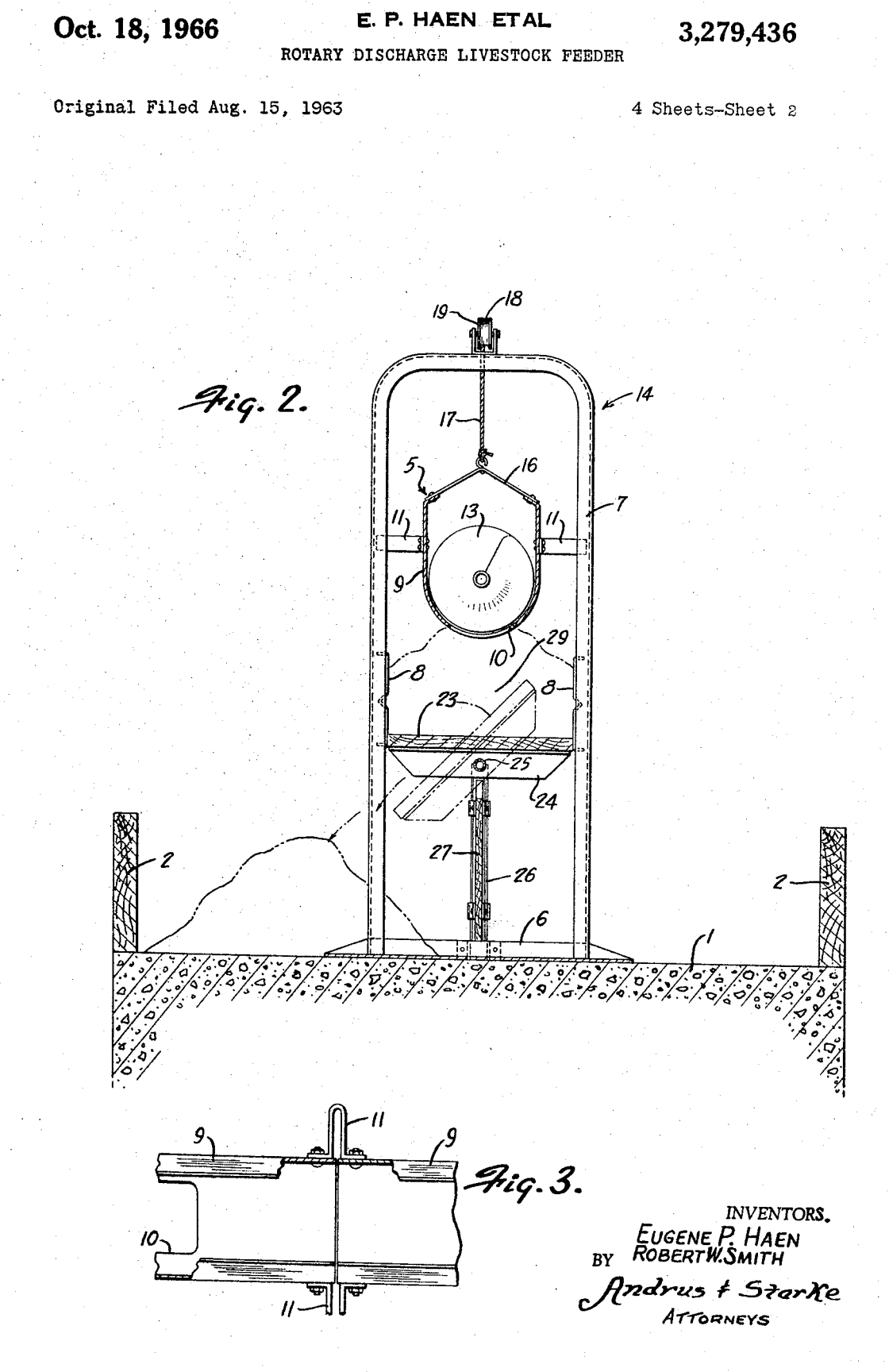

The conveyor mechanism 5 includes a generally U-shaped conveyor housing 9 having a series of openings 10 located in the bottom of the housing. The conveyor housing 9 is formed of a number of housing sections which are located in an end-to-end relation and are connected together by connecting straps 11. As best shown in FIGS. 1 and 3, the straps 11 are generally U-shaped and the outer bent ends of the straps 11 are guided in vertical movement within the channel-shaped supports 7 as the conveyor housing 9 is raised and lowered.

Feed is introduced into the conveyor housing 9 by a hopper 12 which is connected to one end of the housing, and the feed is fed through the conveyor housing by a spiral flight or auger 13 and discharged through the openings 10 in the housing. The feed can be introduced into the hopper 12 either manually or by use of automatic conveying equipment.

The auger 13 is driven by a motor 14 which is connected through a speed reduction unit 15 to the end of the auger 13.

The conveyor housing 9 is suspended from the supports 7 by a series of V-shaped straps 16 which are connected to housing 9 and are suspended from cables 17. Each of the cables 17 is spliced to a longitudinally extending cable 18 and the cables 17 and 18 pass over pulleys 19 which are rotatably mounted on the upper end of each support 7. The longitudinal cable 18 is trained over pulleys 20 and 21 which are connected to the support 7 located adjacent the hopper 12, and the cable 18 is then connected to a winch 22. By rotating the winch 22, the conveyor housing 9 can be raised and lowered with respect to the diverter board 23. As shown in the drawings, winch 22 is operated manually by a handle. However, it is contemplated that the winch can be driven by a motor or other drive mechanism if desired.

According to the invention, a feed distributing member 23 is mounted beneath the conveyor housing 9 and extends the length of the feed bunk 1. As best shown in FIG. 2, the feed distributing member 23 is mounted horizontally and is located at the lower ends of the side walls 8, defining a trough or feed chamber in combination with the side walls 8. The feed distributing member 23 is formed of a series of individual boards which are connected together by cross members 24. The cross members 24 are secured to a longitudinally extending shaft 25 which is rotatably mounted on vertical posts 26. A divider wall 27 is connected to the post 26 and serves to divide the feed bunk 1 into two feeding areas.

To tilt the member 23 and dump the feed to either side of the wall 27, a handle 28 is connected to one end of the shaft 25. While the drawing shows a handle to manually tilt the member 23, it is contemplated that shaft 25 can be connected to a motor or other drive mechanism so that the board 23 can be tilted automatically.

The position of the conveyor housing determines the amount of feed to be fed to the feeding area. If the housing 9 is at its lowermost position resting on board 23, no feed will be distributed through the openings 10 and the feed will be conveyed directly through the housing. As the housing 9 is raised above the board 23, the amount of feed discharged through openings 10 and collected in the trough area 29, defined by board 23 and side walls 8, is also increased.

In operation, the feed is conveyed through the conveyor housing 9 and the board 23 is in the horizontal position so that the feed which is discharged through the openings 10 in the conveyor housing will be contained in the trough area 29. The trough 29 will be initially filled at a location adjacent the hopper and as this area is filled, the feed will progressively fill the trough 29 to the opposite end of the conveyor housing. When the entire trough 29 has been filled with feed, the board 23 is tilted so that the feed is then dumped to either side of the feed bunk 1, as shown in FIG. 2.

It is contemplated that an automatic mechanism can be employed to stop the drive motor 14 and/or to pivot the board 23, if desired. As shown in FIG. 4, a paddle or flap 30 is hinged or pivotally connected to the conveyor housing at the end of the housing. When the feed being discharged through the openings 10 into the trough area 29 builds up, it will pivot the flap 30 into contact with a pressure sensitive switch 31 which is mounted on a support 32 located adjacent the end of the feed bunk. The pressure-sensitive switch 31 can be connected in the electrical control circuit with motor 14 to thereby shut off the motor when the flap 30 is pivoted. Alternately, the pivotal movement of board 23 can be controlled by a motor, and the pressure-sensitive switch 31 can be connected in the control circuit with this motor to thereby tilt the board 23 and dump the silage when the pressure-sensitive switch 31 is actuated.

FIGS. 5 and 6 illustrate a modified form of the invention in which the feed is distributed to cattle or other livestock which are housed in a barn or other structure. The barn includes a foundation 33 having a raised central feed alley 34 and a pair of feed troughs 35 which are located along the central feed alley. Curbs 36 are located laterally of the feed trough and support stanchion frames 37 for the cattle or livestock which are being fed.

The feeding apparatus includes a frame 38, which is similar to the frame 6 of the first embodiment, and the frame 38 is supported by the ceiling beams 39 of the barn. As shown in FIG. 5, a series of rails 40 are suspended from brackets attached to ceiling beams 39, and the rails 40 are provided with a series of openings 41. A pair of longitudinal shafts 42 are rotatably mounted within lugs 43 which extend upwardly from the supports 7 of the frame 38, and gears 44 are connected to the shafts 42 and are adapted to engage the openings 41 in the rails 40. The shafts 42 are rotated either manually or by a motor, not shown, and rotation of the shafts 42 and gears 44 serves to move or traverse the frame 38 and the feed conveying mechanism along the rails 40.

The conveying mechanism 5 itself is similar to that described with respect to the first embodiment.

In operation, the conveyor housing 9 is positioned the desired distance or height above the board 23 and the feed is conveyed through the conveyor housing 9 and is discharged through the openings 10 into the trough area 29 defined by the board 23 and the side walls 8. When the feed fills the trough 29 throughout the length of the feeder, the board 23 is tilted or pivoted by actuation of handle 28 to thereby dump feed into one of the feed troughs 35, as shown in FIG. 5. The frame 38 and the conveyor mechanism 5 can then be moved along the rails 40 to a position above the other feed trough 35 and feed can similarly be distributed into that feed trough.

FIGS. 7 to 10 illustrate another modified form of the invention. In this embodiment, a feed conveying mechanism 46 is mounted on a feed bunk 47 similar to feed bunk 1 of the first embodiment. The conveying mechanism includes a series of upright supports 48 which are spaced along the length of the feed bunk and are connected to base members 49 secured to bunk 47.

A generally U-shaped conveyor housing 50 is mounted on angle bars 51 secured to supports 48 and is provided with a series of openings 52 in the bottom surface which extend substantially the length of the conveyor. The ends of the conveyor housing 50 are enclosed by end plates 53.

Feed is conveyed through the housing 50 by an auger or spiral flighting 54 which is secured to shaft 55. One end of shaft 55 extends through end wall 53 and carries a sprocket 56. A chain 57 connects sprocket 56 with a sprocket 58 on shaft 59 and the shaft 59 also carries a pulley 60 which is connected through belt 61 to a pulley 62 mounted on the shaft of motor 63. With this structure, rotation of the motor drive shaft will operate through belt drive 61 and chain drive 57 to rotate the auger 54 within the housing 50, to convey the feed through the housing.

Feed may be introduced into the end of the conveyor housing 50 by a hopper or other conveying unit, not shown, and the feed is conveyed through the housing by auger 54 and discharged through the openings 52.

According to the invention, a rotatable feed distributing member 64 is positioned beneath the housing 50 and serves to receive the feed discharged from the openings 52 and distribute the same to the feed area. The feed distributing member 64 includes a shaft 65 journaled within a series of columns or posts which extend upwardly from bunk 47 at spaced intervals. The feed distributing member 64 also includes a series of vanes 67 which are connected to shaft 65 and extend radially outward from the shaft. The vanes 67 define feed receiving sectors or compartments 68. As shown in the drawings, four vanes 67 are employed and define four compartments 68. However, any number of vanes can be used depending upon the size and shape of the unit and the feed requirements.

The feed bunk is divided into a pair of feeding areas 69 and 70 by a central wall 71 which extends longitudinally of the feed bunk between the posts 66. The wall 71 may be eliminated if desired, and the feed distributing member 64 can be used with an open bunk.

In operation, the vanes 67 are positioned so that one of the compartments 68 is located beneath the openings 52 in housing 50. The feed being conveyed through the housing by the auger 54 is discharged through the openings 52 and fills the compartment 68. When the compartment is filled, the feed distributing member 64 is rotated in either direction to thereby dump the feed from the compartment 68 into one of the feed areas 69 or 70 and simultaneously position the next adjacent compartment beneath the openings 52 in a position where this compartment can then be filled with feed being discharged through the openings 52.

An automatic control system is utilized to control the movement of the feed distributing member 64. In this regard, a sprocket 72 is connected to the end of the shaft 65 and the sprocket is connected to a sprocket 73 on the drive shaft 74 of a motor 75 by a chain 76. The sprocket carries a series of pins or projections 77 which correspond in number to the number of compartments or sectors 68. The pins are adapted to engage a microswitch 78 which is mounted on a bracket 79 which extends downwardly from the end plate 53.

In addition to the switch 78, a second pressure responsive switch 80 is positioned in the outer end of the conveyor housing 50. A paddle 81 is pivotally mounted in the housing, and when the feed fills the entire compartment, the feed will move toward the outer end of the housing and pivot the paddle 81 against the switch 80 to thereby close the switch.

Figure 10:
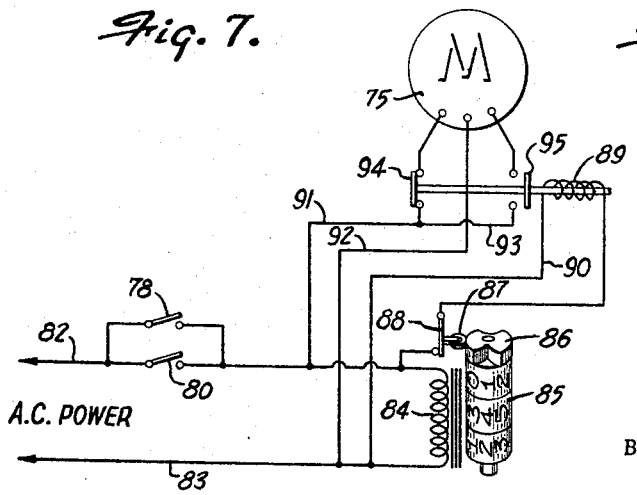
FIG. 10 is an electrical wiring diagram showing the circuitry for operating the feed distributing member.

FIG. 10 shows an electrical circuit for actuating the feed distributing means 64 in the automatic sequence. Lines 82 and 83 are the power lines which are connected to a suitable source of electrical energy, and switches 78 and 80 are connected in parallel in line 82. A coil 84 is connected across the lines 82 and 83 and is operably connected to an electromagnetic counting device 85. The counter is of conventional construction and is adapted to step each time the coil 84 is de-energized. The counter 85 includes a cam 86, and a cam follower 87 is operably connected to a switch 88 and rides on the cam surface. Switch 88 is connected in series with relay 89 in line 90 which is connected across the power lines 82 and 83. The cam surface is provided with recesses or notches at predetermined locations and the follower 87 is biased outwardly toward the cam surface. During stepping of the counter 85, the follower will fall within the recess or notch in the cam, and the switch 88 will open to thereby de-energize relay 89.

The motor 75 is connected by lines 91 and 92 to power lines 82 and 83 and branch line 93 connects line 91 to the motor. Double-acting switches 94 and 95 are connected in lines 91 and 93, respectively, and are operably connected to the relay 89. When the relay is energized, the switch 95 will close and the switch 94 will open to thereby supply power to the motor through lines 92 and 93 to drive the motor in one direction. When the relay 89 is de-energized, the switch 94 will close and the switch 95 will open to thereby supply current to the motor through lines 91 and 92 and thereby reverse the direction of the motor.

At the start of operation, the switch 78 is held open by one of the pins 77 on sprocket 72 and the switch 80 is also open because the compartment 68 is not filled with silage. As the auger operates to deliver feed through the conveyor, the feed is discharged into the compartment 68 and when the compartment is full, the paddle 81 will be moved into engagement with switch 80 to close the switch 80. Closing of switch 80 closes the circuit through lines 92 and 93 (switch 88 being closed and relay 89 being energized) to start the motor and rotate the shaft 65 and vanes 67. As the feed is dumped from the compartment 68, the switch 80 will open and simultaneously the pin 77 will move out of engagement with the switch 78 to thereby close switch 78 and maintain the closed circuit to the motor. When the sprocket 72 rotates to a position where the next pin 77 engages the switch 78, the switch 78 will be opened and the motor will be stopped. This action will be repeated for the desired number of dumping operations until the follower 87 of switch 88 falls into a notch on the cam 86 in which case the switch 88 will open to thereby de-energize the relay and reverse the motor. The motor will then operate in a reverse direction to thereby reverse the rotation of the vanes and distribute feed to the other feed area. The vanes 67 will then rotate in this second direction for a preset number of dumps of feed until the follower 87 again rides out of the notch on the cam 86 to close switch 88.

With the structures shown in FIGS. 7 to 10, any desired feed pattern can be obtained. For example, it may be desired to fill and dump four compartments of feed to one feed area 69 and then reverse the procedure and dump two compartments of feed to the opposite feed area 70. Any desired feeding system can be employed by changing the contour of the cam 86.

With the feeding device shown in FIGS. 7 to 10, the amount of feed delivered to either of the feed areas 69 and 70 is regulated by the number of sectors or compartments which are filled and dumped. In addition, the housing can be raised or lowered with respect to the feed deflecting member, as illustrated in the first embodiment, to vary the amount of feed collected in the compartment.

While the above description is directed to an automatic system for rotating the vanes 67 it is contemplated that the vanes may be manually operated if desired.

The feeding apparatus of the invention can be used for feeding beef cattle, dairy cattle or any other livestock, either in a feed yard or in a barn. The feeding apparatus of the invention has definite advantages over a tube-type feeder in which feed is distributed through openings in the conveyor housing along the entire length of the feed bunk. With the device of the invention, the feed is dumped at one time in a large quantity, and this minimizes wind loss. As the feed is released to the livestock along the entire length of the feeder at the same instant, the device enables the entire herd to be fed at one time and eliminates cattle crowding. The feeding apparatus also eliminates feed separation due to the difference in particle size between various types of feed because the device conveys the feed the full length of the feeder before it is released.

Various modes of carrying out the invention are contemplated as being within the scope of the following claims particularly pointing out and distinctly claiming the subject matter which is regarded as the invention.

We claim:
1. A feeding apparatus for livestock, comprising a conveyor housing having an opening extending through a substantial portion of the length thereof, a conveying member located in the housing and adapted to convey feed through the housing and discharge the same through the opening, a feed distributing member disposed beneath the conveyor housing, said feed distributing member including a series of separate feed-receiving compartments, drive means operably connected to the feed distributing member for moving said member to thereby dump the feed from the compartment located beneath said open- ing and simultaneously position a second compartment in feed-receiving position with respect to the opening in said housing, means responsive to the compartment being filled with a given quantity of feed for actuating said drive means, and means responsive to a series of movements of the feed distributing member in one direction to reverse said drive means and move said feed distributing member in the opposite direction.

2. A feeding apparatus for livestock, comprising a conveyor housing having an opening extending through a substantial portion of the length thereof, a conveying member located in the housing and adapted to convey feed through the housing and discharge the same through the opening, a rotatable feed distributing member disposed beneath the conveyor housing, said feed distributing member including a series of circumferentially spaced feed-receiving compartments, drive means for rotating the feed distributing member to thereby dump the feed from one of the compartments to a feed area on a side of the housing and simultaneously move a second compartment into registry with the opening in said housing, means responsive to the compartment being filled with a given quantity of feed for actuating said drive means to thereby rotate said feed distributing member and dump the feed from said compartment, counting means for counting the number of rotational movements of said feed distributing member, and means responsive to a predetermined number of rotational movements in one direction for reversing the drive means and rotating said feed distributing member in the opposite direction.

3. A feeding apparatus for livestock, comprising a conveyor housing having an opening extending through a substantial portion of the length thereof, a conveying member located in the housing and adapted to convey feed through the housing and discharge the same through the opening, a rotatable feed distributing means disposed beneath the conveyor housing and including a generally horizontal shaft mounted for rotation in a plane located in vertical alignment with the opening in said housing and said feed distributing means also including a series of vanes extending outwardly from the shaft and defining a series of circumferentially spaced feed-receiving compartments, reversible drive means operably connected to the shaft for rotating the shaft to thereby dump the feed from one of the compartments to a feed area on a side of the housing and simultaneously move a second compartment into registry with the opening in said housing, means responsive to the compartment being filled with feed for actuating said drive means to thereby rotate said shaft and dump the feed from the compartment, and means responsive to a predetermined number of rotational movements in one direction for reversing the drive means and rotating said shaft in the opposite direction.

4. A feeding apparatus for livestock, comprising a conveyor housing having a discharge opening extending through a substantial portion of the length thereof, a conveying member located in the housing and disposed to convey feed through the housing and discharge the same through the opening, a feed distributing member located beneath the conveyor housing and including a series of separate compartments having a width substantially greater than the width of said discharge openings movable between feed-receiving and feed-discharging positions, and means operably connected to the feed distributing member for moving a first compartment from the feed-receiving position to the feed-discharging position when a given quantity of feed is received within said compartment and for simultaneously moving a second compartment to the feed-receiving position.

5. The structure of claim 4 in which the feed distributing member comprises a rotatable shaft and a series of radially extending vane which define the feed-receiving compartments.

6. The structure of claim 5 in which the feed distributing member includes four vanes which define four feed-receiving compartments.

7. A feeding apparatus for livestock, comprising conveyor housing having a discharge opening extending through a substantial portion of the length thereof, a conveying member located in the housing and disposed to convey feed through the housing and discharge the same through the opening, a feed distributing member located beneath the conveyor housing and including a series of separate compartments having a width substantially greater than the width of said discharge openings movable between feed-receiving and feed-discharging positions, drive means operably connected to the feed distributing member for successively moving each compartment from a feed-receiving position to a feed-discharging position, means operably connected to the drive means and responsive to a given quantity of feed being received in a first compartment for operating said drive means to move said first compartment from the feed receiving position to the feed-discharge position and to simultaneously move a second compartment to a feed-receiving position, and means operably connected to said drive means and responsive to said second compartment reaching said feed-receiving position for disengaging said drive means.

8. The apparatus of claim 7, in which the feed distributing member comprises a rotatable shaft having a series of radially extending vanes which define the separate compartments and said drive means is connected to said shaft and acts to rotate said feed distributing member about the axis of said shaft.

References Cited by the Examiner

UNITED STATES PATENTS

| 2,646,023 | 7/1953 | Virgil | 119—52 |
| 2,867,314 | 1/1959 | Hansen | 198—64 |
| 2,926,629 | 3/1960 | Hazen | 119—52 |
| 3,051,294 | 8/1962 | Reed | 198—65 |
| 3,103,203 | 9/1963 | Haen | 119—59 |
| 3,112,732 | 12/1963 | Carson | 119—52 |
| 3,115,117 | 12/1963 | Brelsford | 119—56 |
| 3,152,575 | 10/1964 | Singley et al. | 119—56 |
| 3,171,385 | 3/1965 | Decker et al. | 119—51.11 |

SAMUEL KOREN, *Primary Examiner.*

ALDRICH F. MEDBERY, *Examiner.*